(12) United States Patent
Desai

(10) Patent No.: US 8,111,086 B2
(45) Date of Patent: Feb. 7, 2012

(54) METHODS AND SYSTEMS FOR SELECTIVE IMPLEMENTATION OF PROGRESSIVE DISPLAY TECHNIQUES

(75) Inventor: Nitin Desai, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 12/947,647

(22) Filed: Nov. 16, 2010

(65) Prior Publication Data

US 2011/0115800 A1 May 19, 2011

Related U.S. Application Data

(60) Provisional application No. 61/261,528, filed on Nov. 16, 2009.

(51) Int. Cl.
*H01L 25/00* (2006.01)
*G06F 15/00* (2006.01)

(52) U.S. Cl. .......................................... 326/41; 345/501
(58) Field of Classification Search .............. 326/37–47, 326/101; 345/501, 522, 204, 3.2
See application file for complete search history.

(56) References Cited

U.S. PATENT DOCUMENTS

| 6,573,905 | B1 * | 6/2003 | MacInnis et al. | 345/629 |
| 7,839,419 | B2 * | 11/2010 | Hanggie et al. | 345/619 |
| 7,877,502 | B2 * | 1/2011 | Rensin et al. | 709/231 |
| 2001/0028352 | A1 * | 10/2001 | Naegle et al. | 345/501 |
| 2005/0088447 | A1 * | 4/2005 | Hanggie et al. | 345/545 |
| 2005/0088452 | A1 * | 4/2005 | Hanggie et al. | 345/581 |
| 2006/0033728 | A1 * | 2/2006 | Sako | 345/204 |
| 2009/0028047 | A1 * | 1/2009 | Schmidt et al. | 370/235 |
| 2010/0194753 | A1 * | 8/2010 | Robotham et al. | 345/428 |
| 2011/0065490 | A1 * | 3/2011 | Lutnick | 463/16 |
| 2011/0072391 | A1 * | 3/2011 | Hanggie et al. | 715/800 |
| 2011/0115800 | A1 * | 5/2011 | Desai | 345/501 |
| 2011/0141124 | A1 * | 6/2011 | Halls et al. | 345/522 |

* cited by examiner

*Primary Examiner* — Shawki S Ismail
*Assistant Examiner* — Thienvu Tran
(74) *Attorney, Agent, or Firm* — Foley & Lardner LLP; John D. Lanza

(57) ABSTRACT

The present disclosure relates to systems and methods for selective implementation of progressive display techniques based on a number of frames displayed in a window. A first hooking component identifies for a window displaying first application data on a local computing device a number of frames to be displayed in the window. A display manager generates, based on the identified number of frames to be displayed, an instruction to compress an identification of an update to the application data. The data is compressed and sent and transmitted to the local device in order to be displayed on the window. A display manager may determine for another window displaying a different application data on the local device whether or not to compress a second identification of an update to the second application data. The second application data may be transmitted to the local device compressed or not compressed based on the determination.

27 Claims, 10 Drawing Sheets

METHODS AND SYSTEMS FOR SELECTIVE IMPLEMENTATION OF PROGRESSIVE DISPLAY TECHNIQUES

RELATED APPLICATIONS

This application claims the benefit of and priority to U.S. provisional Application No. 61/261,528, entitled "Methods and Systems for Selective Implementation of Progressive Display Techniques" and filed on Nov. 16, 2009, which is incorporated herein by reference in its entirety.

FIELD OF THE INVENTION

The present application generally relates to data communication networks. In particular, the present application relates to systems and methods for implementation of display techniques.

BACKGROUND OF THE INVENTION

A server running on a network of an enterprise may provide services to remote clients. The services may include applications running locally on the server and accessed by the remote clients over the network. The clients using the applications may receive various display windows which may include application related information or functions, such as for example graphical user interfaces, displays or graphics. As the applications may vary in type, format and resources utilized, some applications may require more resources than others. The users may interact with some application more than with others for a specific period of time. As the bandwidth on the network may be limited or the demand of the user may increase, the enterprise may wish to improve the efficiency of the data transmission between the remote clients and the server.

BRIEF SUMMARY OF THE INVENTION

In instances where a virtual server servicing requests experiences a failure, the service provided by the load balancer may be interrupted and clients may experience a delay. Other virtual servers may take on the traffic which was previously serviced by the failed virtual server.

The present disclosure relates to methods and systems for selective implementation of progressive display techniques. In particular, the present disclosure relates to methods and systems for selective implementation of progressive display techniques, based on a number of frames displayed in windows in a period of time for individual application windows. These progressive display techniques may be implemented on systems with composited desktop environments and on systems without the composited desktop environments.

A system designed to transmit either two-dimensional or three-dimensional graphics between a remote computing machine and a local computing machine often requires an extensive amount of resources for any number of reasons. In many cases, these systems can be required to transmit a large volume of images over a short period of time, or to transmit complex graphics that require a great deal of resources. Delivery of resources—such as applications, desktops, virtual machines, or other remotely delivered resources—can in many instances require fast delivery of images to many different types of computing environments.

Many methods and techniques exist to compress and encode graphics to alleviate the strain graphics processing places on systems and networks. Conventionally, these solutions apply a compression technique to all or none of the graphics sent to the local computing machine. These solutions are typically static, making a determination regarding whether to apply a compression technique or not at fixed points in time.

In some environments, however, some applications may require different levels of image quality at different points in time than other applications. For example, in some embodiments in which an image is frequently updated, the aesthetic qualities of the image may be less important to a user due to the frequency of the updates; in other embodiments in which an image is less frequently updated, the aesthetic qualities of the image may be more important to the user. Typically, environments apply compression techniques or progressive display techniques based upon an amount of bandwidth available to a computing machine rather than based on a level of quality desired by a user. Furthermore, conventional environments do not typically address scenarios—such as those displaying composited desktop environments—in which a particular application may require higher or lower quality of images than another application or the rest of a desktop computing environment.

In one aspect, a method for selective implementation of progressive display techniques, based on a number of frames displayed in windows in a period of time for individual application windows in composited desktop environments includes identifying, for a first window displaying application output data on a local computing device, a number of frames displayed in the first window in a period of time, the application output data generated by a first application executing on a remote computing device. The method includes compressing an identification of an update to the application output data generated by the first application, responsive to the identified number of frames. The method includes transmitting, from the remote computing device to the local computing device, the compressed identification. The method includes identifying, for a second window displaying application output data on the local computing device, a number of frames displayed in the second window in a period of time, the application output data generated by a second application executing on the remote computing device. The method includes transmitting, from the remote computing device to the local computing device, an uncompressed identification of an update to the application output data generated by the second application.

In another aspect, a method for selective implementation of progressive display techniques, based on a number of frames displayed in windows in a period of time for individual application windows in composited desktop environments includes identifying, for a first window displaying application output data on a local computing device, a number of frames displayed in the first window in a period of time, the application output data generated by a first application executing on a remote computing device. The method includes compressing an identification of an update to the application output data generated by the first application, responsive to the identified number of frames. The method includes transmitting, from the remote computing device to the local computing device, the compressed identification. The method includes determining, responsive to the identified number of frames displayed in the first window in the period of time, for a second window displaying application output data on the local computing device, to transmit a compressed identification of an update to the application output data generated by a second application executing on the remote computing device. The method includes transmitting, from the remote computing device to the local computing device, a compressed identification of an update to the application output data generated by the second application.

In still another aspect, a method for selective implementation of progressive display techniques, based on a number of frames displayed in windows in a period of time for individual application windows in composited desktop environments includes identifying, for a first window displaying application output data on a local computing device, a number of frames displayed in the first window in a period of time, the application output data generated by a first application executing on a remote computing device. The method includes compressing an identification of an update to the application output data generated by the first application, responsive to the identified number of frames. The method includes transmitting, from the remote computing device to the local computing device, the compressed identification. The method includes determining, responsive to the identified number of frames displayed in the first window in the period of time, for a composited desktop displaying output data on the local computing device, to transmit a compressed identification of an update to the output data generated by a remote desktop composition engine executing on the remote computing device. The method includes transmitting, from the remote computing device to the local computing device, a compressed identification of an update to the output data generated by the remote desktop composition engine.

In yet another aspect, a system for selective implementation of progressive display techniques, based on a number of frames displayed in windows in a period of time for individual application windows in composited desktop environments includes a first hooking component, a second hooking component, a display manager and a remote agent. The first hooking component, executing on a remote computing device, identifies, for a first window displaying application output data on a local computing device, a number of frames displayed in the first window in a period of time, the application output data generated by a first application executing on the remote computing device. The second hooking component, executing on the remote computing device, identifies, for a second window displaying application output data on the local computing device, a number of frames displayed in the second window in a period of time, the application output data generated by a second application executing on the remote computing device. The display manager, executing on the remote computing device, determines whether to direct the compression of at least one of a first output data update generated by the first application and a second output data update generated by the second application. The remote agent, executing on the remote computing device, receives an instruction from the display manager to compress the first output data update, receives an instruction from the display manager not to compress the second output data update, compresses the first output data update, and transmits, to the local computing device, the compressed first output data update and the uncompressed second output data update.

In one embodiment, the remote agent includes a receiver for receiving an instruction from the display manager. In another embodiment, the system includes a remote desktop composition engine executing on the remote computing device and generating a composited desktop environment. In still another embodiment, the system includes a local desktop window manager executing on the local computing device and displaying the composited desktop environment generated by the remote desktop composition engine. In still another embodiment, the display manager determines to direct the compression of the second output data update responsive to the identification of the number of frames displayed in the first window in the period of time. In another embodiment, the remote agent receives an instruction from the display manager to compress the second output data update and receives an instruction from the display manager not to compress the first output data update; the remote agent compresses the second output data update and transmits, to the local computing device, the compressed second output data update and the uncompressed first output data update.

In some aspects, the present disclosure relates to a method for selective implementation of progressive display techniques, based on a number of frames displayed in a window in a period of time. A first hooking component may identify for a first window displaying first application output data on a local computing device, a number of frames displayed in the first window in a period of time, the first application output data generated by a first application executing on a remote computing device. A remote agent may compress an identification of an update to the first application output data generated by the first application, responsive to the identified number of frames. The remote agent may transmit from the remote computing device to the local computing device, the compressed identification. A second hooking component may identify for a second window displaying second application output data on the local computing device, a number of frames displayed in the second window in a period of time, the second application output data generated by a second application executing on the remote computing device. The remote agent may transmit from the remote computing device to the local computing device an uncompressed identification of an update to the second application output data generated by the second application.

In some embodiments, the first hooking component receives information identifying a number of frames generated by the first application. In further embodiments, the first hooking component forwards the information identifying the number of frames to a display manager. In yet further embodiments, a display manager monitors the frame rate of the first application output data and the second application output data. In further embodiments, the display manager determines that a frame rate of the first application output data has changed. In still further embodiments, the display manager generates an instruction for the remote agent to compress the identification of the update to the first application output data in response to determining that the frame rate has changed. In yet further embodiments, the display manager determines, based on the information identifying the number of frames that a frame rate of the first application output data has changed. In some embodiments, the display manager transmits to the remote agent, an instruction to compress the identification of the update to the first application output data based on the determined change in the frame rate. In other embodiments, the display manager transmits to the remote agent an instruction not to compress the identification of the update to the second application output data based on the determined change in the frame rate.

In some aspects, the present disclosure relates to a method for selective implementation of progressive display techniques, based on a number of frames displayed in a window. A first hooking component may identify for a first window displaying first application output data on a local computing device, a number of frames to be displayed in the first window in a period of time, the first application output data generated by a first application executing on a remote computing device. A display manager may generate, based on the identified number of frames to be displayed, an instruction to compress an identification of an update to the first application output data generated by the first application. A remote agent may compress an identification of an update to the first application output data generated by the first application. The remote agent may transmit from the remote computing device to the local computing device, the compressed identification. A display manager may determine for a second window displaying second application output data on the local computing device, whether to compress or not to compress a second identification of an update to the second application output data generated by a second application executing on the remote computing device. The remote agent may transmit from the remote computing device to the local computing device the second identification of the update to the second application output data generated by the second application. The second identification of the update to the second application output data may be compressed or not compressed based on the determination by the display manager.

In some embodiments, the display manager determines to compress or not to compress the second identification of the update to the second application output data in response to identifying the number of frames displayed in the first window in the period of time. In further embodiments, the display manager monitors the frame rate of the first application output data and the second application output data. In some other embodiments, the display manager determines to compress the second identification of an update to the second application output data and transmits to a receiving agent at the local computing device, compressed second identification of the update to the second application output data generated by the second application. In some embodiments, the remote agent transmits the compressed second identification of the update to the second application. In further embodiments, the display manager determines not to compress the second identification of an update to the second application output data and transmitting to a receiving agent at the local computing device, uncompressed second identification of the update to the second application output data generated by the second application. In further embodiments, the remote agent transmits the uncompressed second identification of the update.

In some aspects, the present disclosure relates to a method for selective implementation of progressive display techniques, based on a number of frames displayed in windows in a period of time for individual application windows in composited desktop environments. A local agent on a local computing device or a first hooking component on a remote computing device may identify for a first window displaying first application output data a number of frames displayed in the first window in a period of time, the first application output data generated by a first application executing on a remote computing device. An identification of an update to the first application output data generated by the first application may be compressed responsive to the identified number of frames. The compressed identification may be transmitted from the remote computing device to the local computing device. Responsive to the identified number of frames displayed in the first window in the period of time a determination may be made for a composited desktop displaying output data on the local computing device, to transmit a compressed identification of an update to the output data generated by a remote desktop window manager on the remote computing device. A compressed identification of the update to the output data generated by the remote desktop window manager may be transmitted to the local computing device from the remote computing device.

In some aspects, the present disclosure relates to a system for selective implementation of progressive display techniques based on a number of frames displayed in a window. A first hooking component executing on a remote computing device may identify for a first window displaying first application output data on a local computing device, a number of frames displayed in the first window in a period of time. The first application output data may be generated by a first application executing on the remote computing device. A second hooking component executing on the remote computing device may identify for a second window displaying second application output data on the local computing device, a number of frames displayed in the second window in a period of time. The second application output data may be generated by a second application executing on the remote computing device. A display manager executing on the remote computing device may determine whether or not to direct compression of at least one of a first output application data update generated by the first application and a second output application data update generated by the second application. A remote agent executing on the remote computing device may receive an instruction from the display manager to compress the first output data update, receive an instruction from the display manager not to compress the second output data update, compress the first output data update, and transmit to the local computing device the compressed first output data update and the uncompressed second output data update.

In some embodiments, the remote agent further comprises a receiver for receiving an instruction from the display manager. In further embodiments, a remote desktop window manager executes on the remote computing device and generates a composited desktop environment. In some embodiments, a local desktop window manager executes on the local computing device and displays the composited desktop environment generated by the remote desktop window manager. In further embodiments, the display manager further comprises means for determining to direct the compression of the second output data update responsive to the identification of the number of frames displayed in the first window in the period of time. In some embodiments, the remote agent further comprises means for receiving an instruction from the display manager to compress the second output data update, means for receiving an instruction from the display manager not to compress the first output data update, means for compressing the second output data update and means for transmitting, to the local computing device, the compressed second output data update and the uncompressed first output data update.

In some embodiments, the display manager further comprises means for determining, responsive to the identified number of frames displayed in the first window in the period of time, for a composited desktop displaying output data on the local computing device, to direct the compression of an update to the output data generated by a remote desktop window manager executing on the remote computing device. In some embodiments, the remote agent further comprises means for receiving an instruction from the display manager to compress the output data update generated by the remote desktop window manager, means for compressing the output data update generated by the remote desktop window manager and means for transmitting, to the local computing device, the compressed output data update generated by the remote desktop window manager.

In some aspects, the present disclosure relates to a system for selective implementation of progressive display techniques, based on a number of frames displayed in windows in a period of time for individual application windows in composited desktop environments. The system may comprise a means for identifying, for a first window displaying application output data on a local computing device, a number of frames displayed in the first window in a period of time, the application output data generated by a first application executing on a remote computing device. The system may also include a means for compressing an identification of an update to the application output data generated by the first application, responsive to the identified number of frames. The system may further include a means for transmitting, from the remote computing device to the local computing device, the compressed identification. The system may also include a means for identifying, for a second window displaying application output data on the local computing device, a number of frames displayed in the second window in a period of time, the application output data generated by a second application executing on the remote computing device. The system may further include a means for transmitting, from the remote computing device to the local computing device, an uncompressed identification of an update to the application output data generated by the second application.

In some aspects, the present disclosure relates to a system for selective implementation of progressive display techniques, based on a number of frames displayed in windows in a period of time for individual application windows in composited desktop environments. The system comprises a means for identifying, for a first window displaying application output data on a local computing device, a number of frames displayed in the first window in a period of time, the application output data generated by a first application executing on a remote computing device. The system may also include a means for compressing an identification of an update to the application output data generated by the first application, responsive to the identified number of frames. The system may further include a means for transmitting, from the remote computing device to the local computing device, the compressed identification and a means for determining, responsive to the identified number of frames displayed in the first window in the period of time, for a second window displaying application output data on the local computing device, to transmit a compressed identification of an update to the application output data generated by a second application executing on the remote computing device. The system may also include a means for transmitting, from the remote computing device to the local computing device, a compressed identification of an update to the application output data generated by the second application.

In some aspects, the present disclosure relates to a system for selective implementation of progressive display techniques, based on a number of frames displayed in windows in a period of time for individual application windows in composited desktop environments. The present disclosure may also relate to systems and methods for selective implementation of progressive display techniques based on a number of frames displayed in a window within a period of time for individual application windows in a non-composited desktop system. The system may include a means for identifying, for a first window displaying application output data on a local computing device, a number of frames displayed in the first window in a period of time, the application output data generated by a first application executing on a remote computing device. The system may also include a means for compressing an identification of an update to the application output data generated by the first application, responsive to the identified number of frames. The system may comprise a means for transmitting, from the remote computing device to the local computing device, the compressed identification. The system may further include a means for determining, responsive to the identified number of frames displayed in the first window in the period of time, for a composited desktop displaying output data on the local computing device, to transmit a compressed identification of an update to the output data generated by a remote desktop window manager executing on the remote computing device. The system may include a means for transmitting, from the remote computing device to the local computing device, a compressed identification of an update to the output data generated by the remote desktop window manager.

BRIEF DESCRIPTION OF THE FIGURES

The foregoing and other objects, aspects, features, and advantages of the disclosure will become more apparent and better understood by referring to the following description taken in conjunction with the accompanying drawings, in which.

DETAILED DESCRIPTION OF THE INVENTION

Figure 1A:
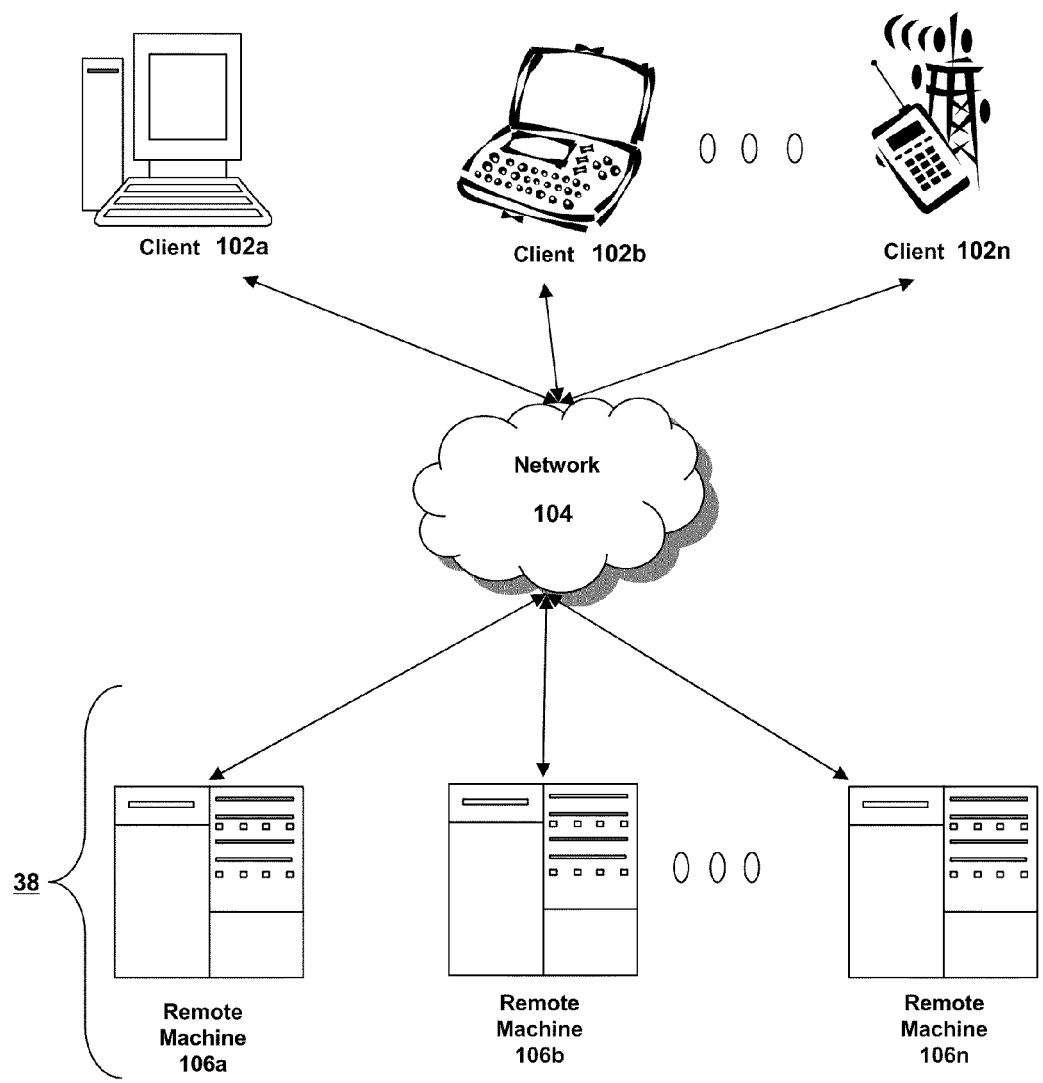
FIG. 1A is a block diagram depicting an embodiment of a network environment comprising local machines in communication with remote machines.

Referring now to FIG. 1A, an embodiment of a network environment is depicted. In brief overview, the network environment comprises one or more local machines 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a local machine 102 has the capacity to function as both a client node seeking access to resources provided by a server and as a server providing access to hosted resources for other clients 102a-102n.

Although FIG. 1A shows a network 104 between the local machines 102 and the remote machines 106, the local machines 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the local machines 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38. In another of these embodiments, the remote machines 106 may be geographically dispersed. In other embodiments, a server farm 38 may be administered as a single entity. In still other embodiments, the server farm 38 comprises a plurality of server farms 38. The remote machines 106 within each server farm 38 can be heterogeneous—one or more of the remote machines 106 can operate according to one type of operating system platform (e.g., WINDOWS NT, WINDOWS 2003, or WINDOWS 2008, all of which are manufactured by Microsoft Corp. of Redmond, Wash.), while one or more of the other remote machines 106 can operate on according to another type of operating system platform (e.g., Unix or Linux).

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a local machine 102. In other embodiments, a remote machine 106 executes a virtual machine, which provides an execution session within which applications execute on behalf of a user of a local machine 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a local machine 102 communicates with a remote machine 106. In one embodiment, the local machine 102 communicates directly with one of the remote machines 106 in a server farm 38. In another embodiment, the local machine 102 executes a program neighborhood application to communicate with a remote machine 106 in a server farm 38. In still another embodiment, the remote machine 106 provides the functionality of a master node. In some embodiments, the local machine 102 communicates with the remote machine 106 in the server farm 38 through a network 104. Over the network 104, the local machine 102 can, for example, request execution of various applications hosted by the remote machines 106a-106n in the server farm 38 and receive output of the results of the application execution for display. In some embodiments, only a master node provides the functionality required to identify and provide address information associated with a remote machine 106b hosting a requested application.

In one embodiment, the remote machine 106 provides the functionality of a web server. In another embodiment, the remote machine 106a receives requests from the local machine 102, forwards the requests to a second remote machine 106b and responds to the request by the local machine 102 with a response to the request from the remote machine 106b. In still another embodiment, the remote machine 106a acquires an enumeration of applications available to the local machine 102 and address information associated with a remote machine 106b hosting an application identified by the enumeration of applications. In yet another embodiment, the remote machine 106 presents the response to the request to the local machine 102 using a web interface. In one embodiment, the local machine 102 communicates directly with the remote machine 106 to access the identified application. In another embodiment, the local machine 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on local machine 102. In some embodiments, the application may be a server-based or a remote-based application executed on behalf of the local machine 102 on a remote machine 106. In other embodiments, the remote machine 106 may display output to the local machine 102 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

Figure 1B:
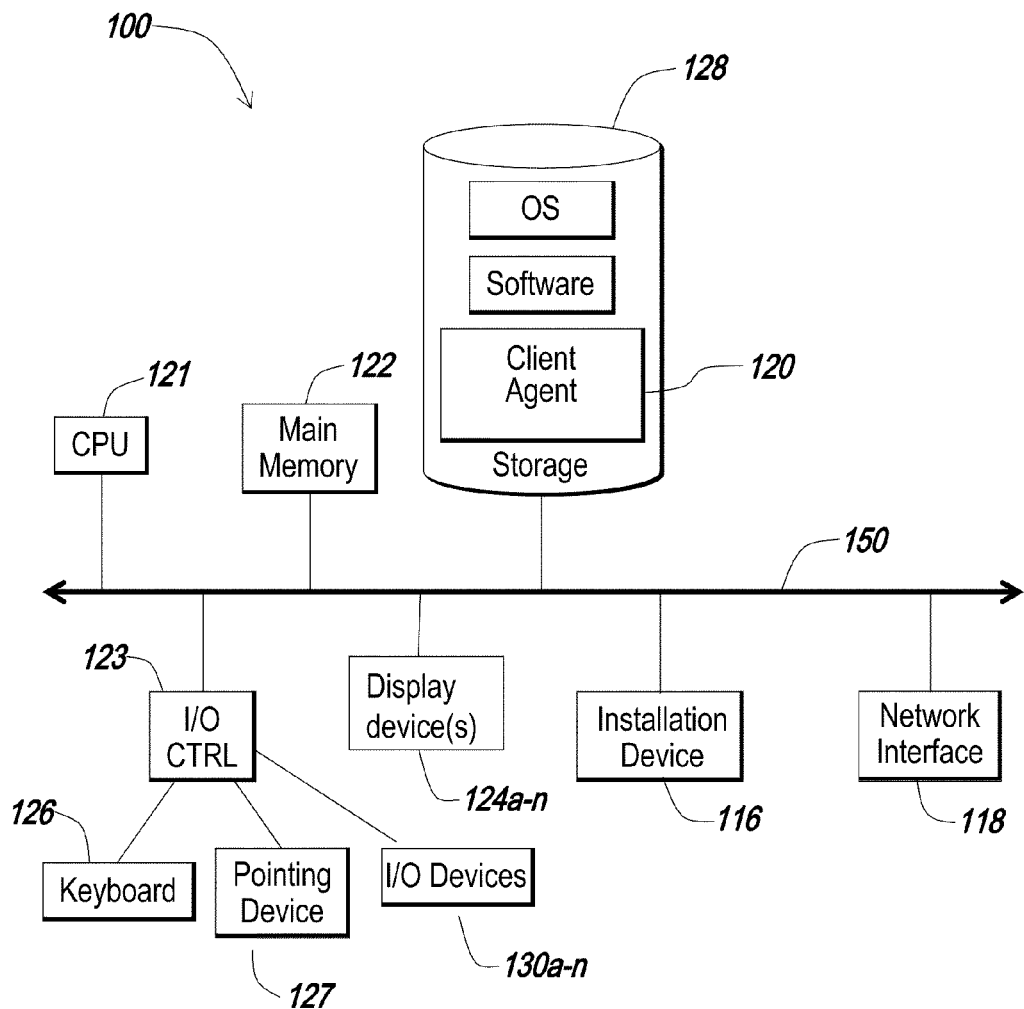
FIGS. 1B-1E depict block diagrams depicting embodiments of computers useful in connection with the methods and systems described herein.
Figure 1C:
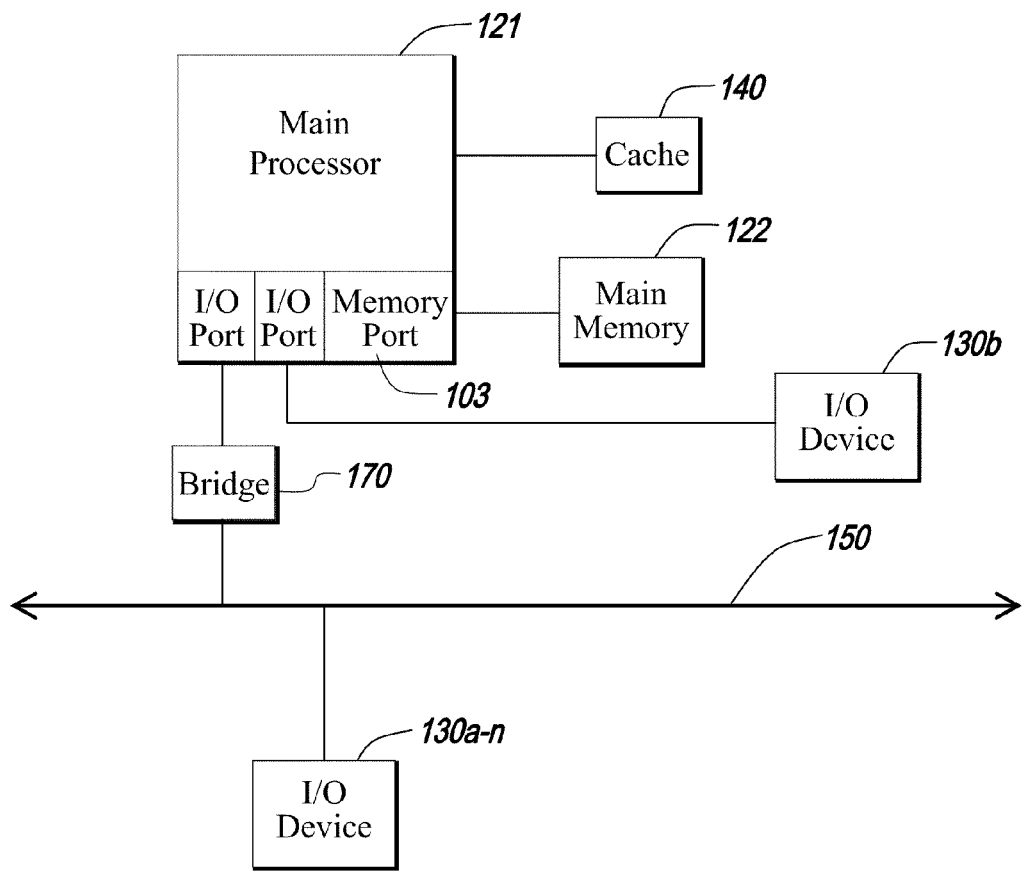

The local machine 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the local machine 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124$a$-$n$, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130$a$-130$n$ (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is a device in the iPhone line of smartphones, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

Figure 1D:
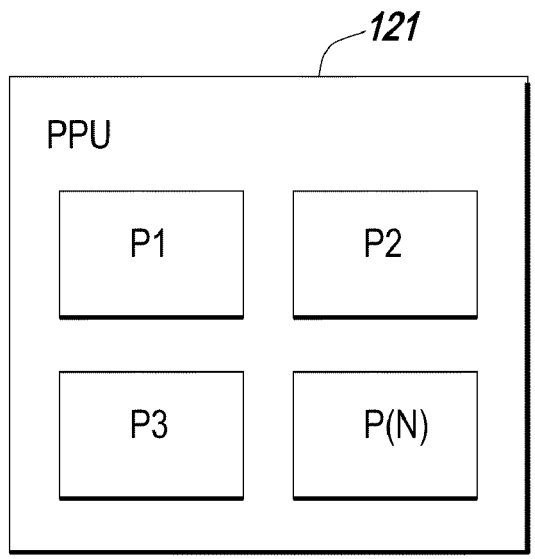

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
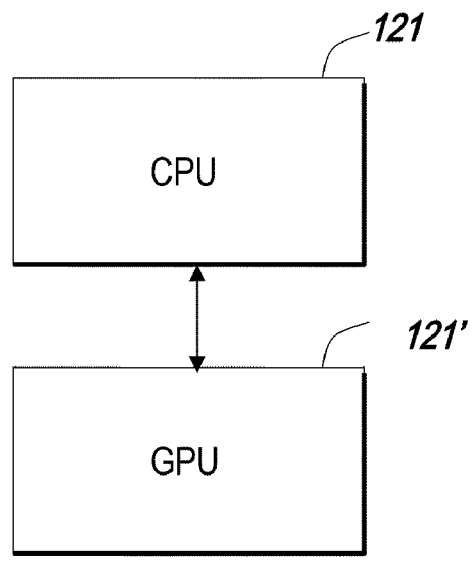

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

Figure 2A:
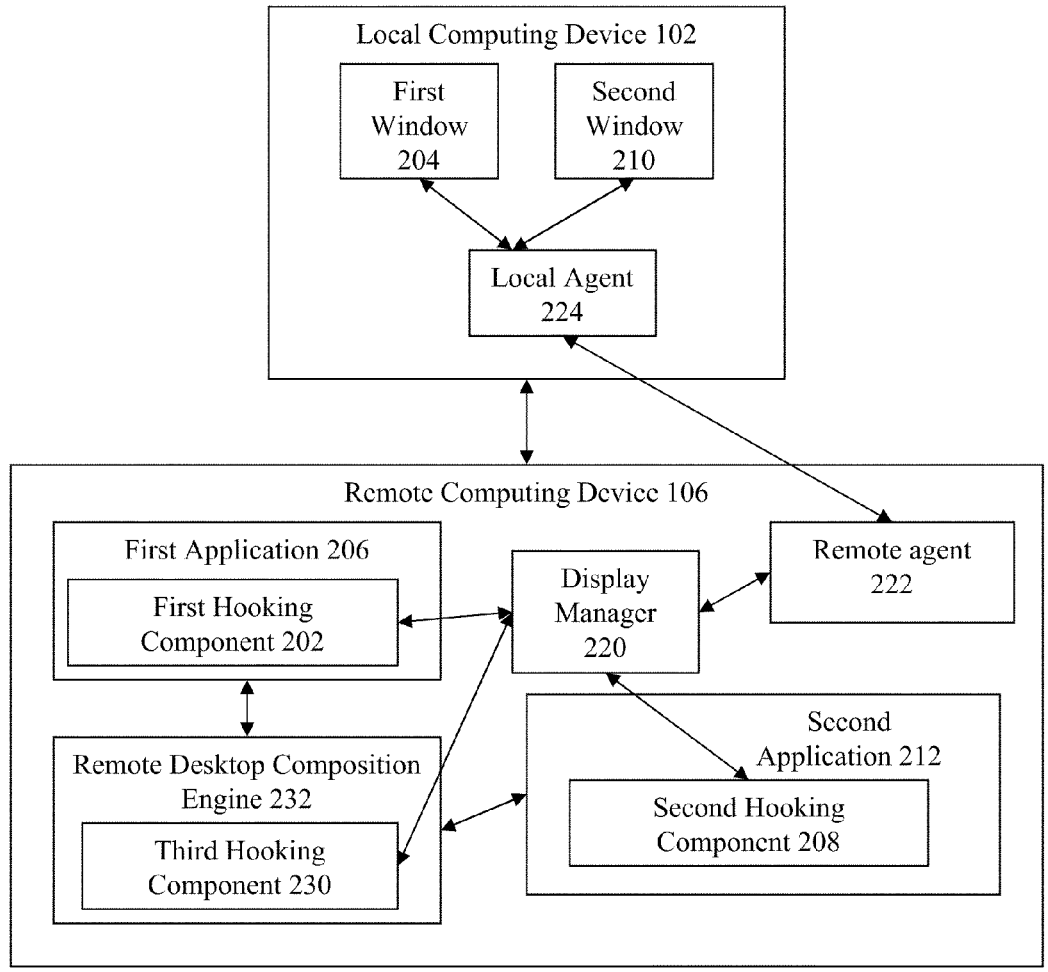
FIG. 2A is a block diagram depicting one embodiment of a system for selective implementation of progressive display techniques, based on a number of frames displayed in windows in a period of time for individual application windows in composited desktop environments.

Referring now to FIG. 2A, a block diagram depicts one embodiment of a system for selective implementation of progressive display techniques. The techniques may be based on a number of frames displayed in windows in a period of time for individual application windows in composited desktop environments. In some embodiments, the techniques are based on a number of frames received by a driver, such as a display driver, from an application within a period of time in a non-desktop composited system. In brief overview, the system includes a first hooking component 202, a second hooking component 208, a display manager 220, and a remote agent 222. The first hooking component 202 executes on a remote computing device 106. The first hooking component 202 identifies, for a first window 204 displaying application output data on a local computing device 102, a number of frames displayed in the first window 204 in a period of time. The application output data may be any data or output generated by a first application 206 executing on the remote computing device 106. The second hooking component 208 executes on the remote computing device 106. The second hooking component 208 identifies, for a second window 210 displaying application output data on the local computing device 102, a number of frames displayed in the second window 210 in a period of time. The application output data displayed in the second window may include data or output of a second application 212 executing on the remote computing device 106. The display manager 220 executes on the remote computing device 106. The display manager 220 determines whether to direct, enable, disable or manage the compression of at least one of a first output data update generated by the first application or a second output data update generated by the second application. The remote agent 222 executes on the remote computing device 106. The remote agent 222 may receive an instruction from the display manager 220 to compress the first output data update. The remote agent 222 may receive an instruction from the display manager 220 not to compress the second output data update. The remote agent 222 may compresses the first output data update. The remote agent 222 may transmit, to the local computing device 102, the compressed first output data update for displaying on the first window 204 and the uncompressed second output data update for displaying on the second window 204.

In some embodiments of a non-desktop composited system, first hooking component 202, second hooking component 208, third hooking component 230 and display manager 220 are functions or functional components comprised by a driver. The driver may be a display driver. In some embodiments, the driver is Citrix Graphics Driver, such as Thinwire. The hooking components may comprise functions within the driver monitoring frames and/or calls received from the applications in connection with the data generated by one or more applications. In some embodiments, a call from an application corresponds to a single frame of data generated by an application. In other embodiments, a call corresponds to any number of frames. In some embodiments, based on the number of calls within a period of time or a number of frames within a period of time, display manager 220 determines a change in the frame rate. In some embodiments, based on the number of frames within a period of time the change in the frame rate is detected. The control of the frame rate output to the window of the application on the client device may be determined and/or controlled entirely within a display driver that includes the functionality of the hooking components and/or the display manager 220.

Still referring to FIG. 2A, and in greater detail, the first hooking component 202 executes on a remote computing device 106. Hooking component 202 may comprise hardware, software or a combination of hardware and software. Hooking component 202 may include an executable file, an algorithm, a function, a programming code, a script, an API function, a driver, a library or any other piece of software executable on a processor 121. In one embodiment, the first hooking component 202 is a file system driver. Hooking component 202 may include a driver operating within ICA protocol by Citrix Systems, Inc. In some embodiments, hooking component 202 may include a graphics driver for transmitting graphics commands between a remote computing device 106 and a local computing device 102. Hooking component 202 may include a Thinwire Virtual Display Adapter by Citrix Systems, Inc or a function by the Thinwire Virtual Display Adapter. In some embodiment, the first hooking component 202 is a file system filter driver. Hooking component 202 may include a function of a graphical user interface system, such as Desktop Window Manager or Desktop Compositing Engine by Windows 7 or Windows Vista operating systems of the Microsoft Corporation. Hooking component 202 may be, or include a function, of an application for running or displaying audio or video content, such as for example the Quicktime multimedia player by Apple, Inc or the RealPlayer media player by RealNetworks, Inc. In another embodiment, the first hooking component 202 is a mini-driver. In another embodiment, the first hooking component 202 is a mini-filter. In still another embodiment, the first hooking component 202 is a user mode hooking mechanism. Hooking component 202 may include a function for video buffering. In another embodiment, the first hooking component 202 is a kernel mode hooking mechanism, such as a kernel mode driver. In yet another embodiment, the first hooking component 202 is a user-mode hooking apparatus. In some embodiments, the first hooking component 202 refers to a hooking mechanism that accesses one or more software libraries to perform the functionality described herein.

The first hooking component 202 may include functionality for monitoring and/or identifying a number of frames to be displayed in a window on the client computing device, such as the first window 204. The first hooking component 202 may include functionality to identify for a first window 204 displaying application output data on a local computing device 102 a number of frames displayed in the first window 204 within a period of time. The hooking component 202 may identify or monitor the application output data generated by a first application 206 executing on the remote computing device 106 and intended to be displayed on the client computing device 102. In some embodiments, the first hooking component 202 executes within the first application 206. In other embodiments, the first hooking component 202 executes in an operating system executing on the remote computing device 106. The hooking component may include any functionality for receiving or intercepting any information for identifying a number of frames to be displayed in a window. The hooking component may intercept or receive information from the first application 206 identifying a number of frames per second to be displayed in a window. The hooking component may also identify a rate of change in frames per second to be displayed for a particular window, such as the window 204 or window 210. In one of these embodiments, the first hooking component 202 intercepts communication between the first application 206 and the operating system. In still other embodiments, the first hooking component 202 intercepts a command to modify a setting defining a number of frames displayed in the first window 204 in a period of time. The command may be from the application 206, directed to application 206 or directed to the first hooking component 202.

The second hooking component 212 may include any functionality or embodiment of the first hooking component 202. The second hooking component 212 may be a hooking component executing on a remote computing device 106. As with the first hooking component 202, the second hooking component may include any function of a Thinwire Virtual Display Adapter by Citrix Systems, Inc or a graphical user interface system, such as Desktop Window Manager or Desktop Compositing Engine by the Microsoft Corporation. The second hooking component 212 may include any function of a multimedia player, such as Windows Media Player by Microsoft Corporation, Quicktime by Apple, Inc., or RealPlayer by RealNetworks, Inc. As with the first hooking component 202, the second hooking component 212 may comprise any functionality for monitoring or measuring the frames per second to be displayed in one or more windows on the local computing device 102 or client computing device 102 for any number of applications, such as application 206 or application 212. In one embodiment, the second hooking component 212 is a file system driver. In another embodiment, the second hooking component 212 is a file system filter driver. In another embodiment, the second hooking component 212 is a mini-driver. In another embodiment, the second hooking component 212 is a mini-filter. In still another embodiment, the second hooking component 212 is a user mode hooking mechanism. In still even another embodiment, the second hooking component 212 is a kernel mode hooking mechanism, such as a kernel mode driver. In yet another embodiment, the second hooking component 212 is a user-mode hooking apparatus. In some embodiments, the second hooking component 212 refers to a hooking mechanism that accesses one or more software libraries to perform the functionality described herein.

The second hooking component 212 identifies, for a second window 210 displaying application output data on a local computing device 102, a number of frames displayed in the second window 210 in a period of time, the application output data generated by a second application 212 executing on the remote computing device 106. The second hooking component 212 may identify the change in the rate of frames per second to be displayed in the second window 212. In some embodiments, the second hooking component 212 executes within the second application 212. In other embodiments, the second hooking component 212 executes in an operating system executing on the remote computing device 106. In one of these embodiments, the second hooking component 212 intercepts communication between the second application 212 and the operating system. In still other embodiments, the second hooking component 212 intercepts a command by the second application 212 to modify a setting defining a number of frames displayed in the second window 210 in a period of time.

In some embodiments, a plurality of hooking components execute on the remote computing device 106. In one of these embodiments, a hooking component executes within each of a plurality of applications executing on the remote computing device 106. In another of these embodiments, a hooking component executes within a remote desktop composition engine 232.

A remote desktop composition engine 232 may comprise any graphical user interface or a graphics driver or a function operating on an operating system of a remote computing device 106. In some embodiments, a remote desktop composition engine 232 is referred to as a desktop window manager. In one of these embodiments, the remote desktop composition engine 232 executes in a MICROSOFT operating system (e.g., the WINDOWS 7 or VISTA operating systems). In other embodiments, the remote desktop composition engine 232 is a composition engine executing in a MAC OS operating system. In one embodiment, a remote desktop composition engine 232 is a component that generates a composited desktop environment. In another embodiment, when an application executing on the remote computing device generates output data for display to a user, the application transmits the generated output data to an off-screen buffer (e.g., a storage element that does not direct the rendering of its contents to a display device 124); the remote desktop composition engine 232 retrieves data from the off-screen buffer and uses a subset of the data in generating a composited desktop environment for display to the user. In some embodiments, a remote desktop composition engine 232 is a Thinwire Virtual Display Adapter by Citrix Systems, Inc. The remote desktop composition engine 232 may include a hooking component, such as the third hooking component 230. The third hooking component 230 may include any functionality of the first hooking component 202 and the second hooking component 212.

A remote agent 222 may include any software, hardware or a combination of software and hardware for controlling and/or managing compression of data transmitted between remote computing device 106 and local computing device 102. The remote agent 222 may include an executable file, an algorithm, a function, a programming code, a script, an API function, a driver, a library or any other piece of software executable on a processor 121. Remote agent 222 may include any functionality for controlling, managing or triggering compression, decompression, encryption and/or decryption of data for displaying on windows 204 or 210. A remote agent 222 receives an instruction from the display manager to compress the first output data update, receives an instruction from the display manager not to compress the second output data update, compresses the first output data update, and transmits, to the local computing device, the compressed first output data update and the uncompressed second output data update. In one embodiment, the remote agent 222 includes functionality for communicating with a local agent 224 via a thin-client protocol, a presentation layer protocol, or a remote-display protocol, including, for example, any of the protocols discussed above in connection with FIG. 1A.

Display manager 220 may include any software, hardware or a combination of software and hardware for managing, controlling and triggering compression of data transmitted between devices 102 and 106. The display manager 220 may include executables, functions, algorithms, API, applets or any other functional portions of executable code. Display manager 220 may comprise any function of a Thinwire Virtual Display Adapter by Citrix Systems, Inc or a graphical user interface system, such as Desktop Window Manager or Desktop Compositing Engine by the Microsoft Corporation. Display manager 220 may include functionality for determining whether or not to direct the compression of at least one of a first output data update generated by an application for display within a particular window. Display manager 220 may include functionality to communicate with hooking components 202, 208 and 230 and use the information from the hooking components to determine which output data should be compressed or not compressed. Display manager 220 may determine to compress a particular output data for a particular window 204 or 210 based on information about interaction of the user with a particular window associated with a particular application. For example, display manager 220 may determine to compress or not to compress output data from the first application 206 intended for the first window 204 on device 106 based on the information that the user on device 102 has increased or decreased interaction with the first application 206. Display manager may include any functionality to receive information about the interactivity of the user with the first window 204 or the second window 210 and use this information to set, determine or adjust compression or decompression of the output data from any of the applications 206, 212 or 232.

An application, such as the first application 206 or the second application 212 may be any application running or executing on the remote computing device 106. Applications 206 and/or 212 may be any application accessed by the client from the local computing device 102 and running on the remote computing device 106. The application may be a multimedia presentation application or a function. The application may be a multimedia player, such as a Windows Media Player by Microsoft Corporation, a Quicktime player by Apple, Inc or a RealPlayer by RealNetworks, Inc. The application may be a web browser application, such as Internet Explorer by Microsoft Corporation or a word processing application, such as Microsoft Word by Microsoft Corporation. In one embodiment, the application may be configured to display a first number of frames per period of time while the remote desktop composition engine 232 is configured to display a second number of frames per period of time. In another embodiment, the remote desktop composition engine 232 specifies a number of frames to be displayed per period of time, instead of allowing the application to specify the number of frames to be displayed per period of time.

Windows, such as first window 204 and second window 210, may include any user interface corresponding to applications running on remote computing device 106. Windows 204 and 210 may include any graphical user interface, interactive interface or a display interface for any application 206 or 212. Windows 204 and 210 may include a video display, an audio display, a graphical display, a window for a word processing document, a web browser or an email interface. Windows 204 and 210 may receive data from applications 206 and 212 running on remote computing device 106 and may display the data to the user.

Local agent 224 may be any agent for processing compressed or uncompressed data transmitted between the device 102 and device 106. Local agent 224 may include any functionality for compressing, decompressing, encrypting or decrypting data. Local agent 224 may utilize any instructions from applications 206 and 212 to recreate the data that was compressed on the device 106 side in order to present it in windows 204 and 210. Local agent 224 may include any functionality of remote agent 222 and/or display manager 220.

In some embodiments, a number of frames displayed in a window is controlled by an application or other resource generating output data for display in the window. In one of these embodiments, by way of example, an application executing on a computing device 100 generates output display. In conjunction with an operating system executing on the computing device 100, the application may direct the display of the generated output data in the window, which is displayed to a user (for example, on a display device 124). In another of these embodiments, when the application generates updated output display, the application generates an identification of an update to the output data and the operating system directs the display of the identified update in the window. In still another of these embodiments, the number of frames displayed in a window during a period of time indicates a number of updates to output data displayed in the window during the period of time—by way of example, if the window displays two frames per second, within one second, the window displays output data initially received from the application for display (via the operating system) and then displays a second frame containing updated output data generated by the application. In other embodiments, a high number of frames per period of time indicates that the window displays updates to the initial output data more frequently than if the window displayed a low number of frames per period of time; for example, a window that displays 10 frames per second displays the output data initially received from the application and nine updates while a window that displays two frames per second displays the output data initially received from the application and one update. In still other embodiments, a number of frames displayed per period of time is a result of a level of interaction by the user with an application generating the frames. In one of these embodiments, by way of example, if a user requests a rotation of an image within an application, the number of frames displayed in the period of time is higher than if the user requests a static display of the image.

Figure 2B:
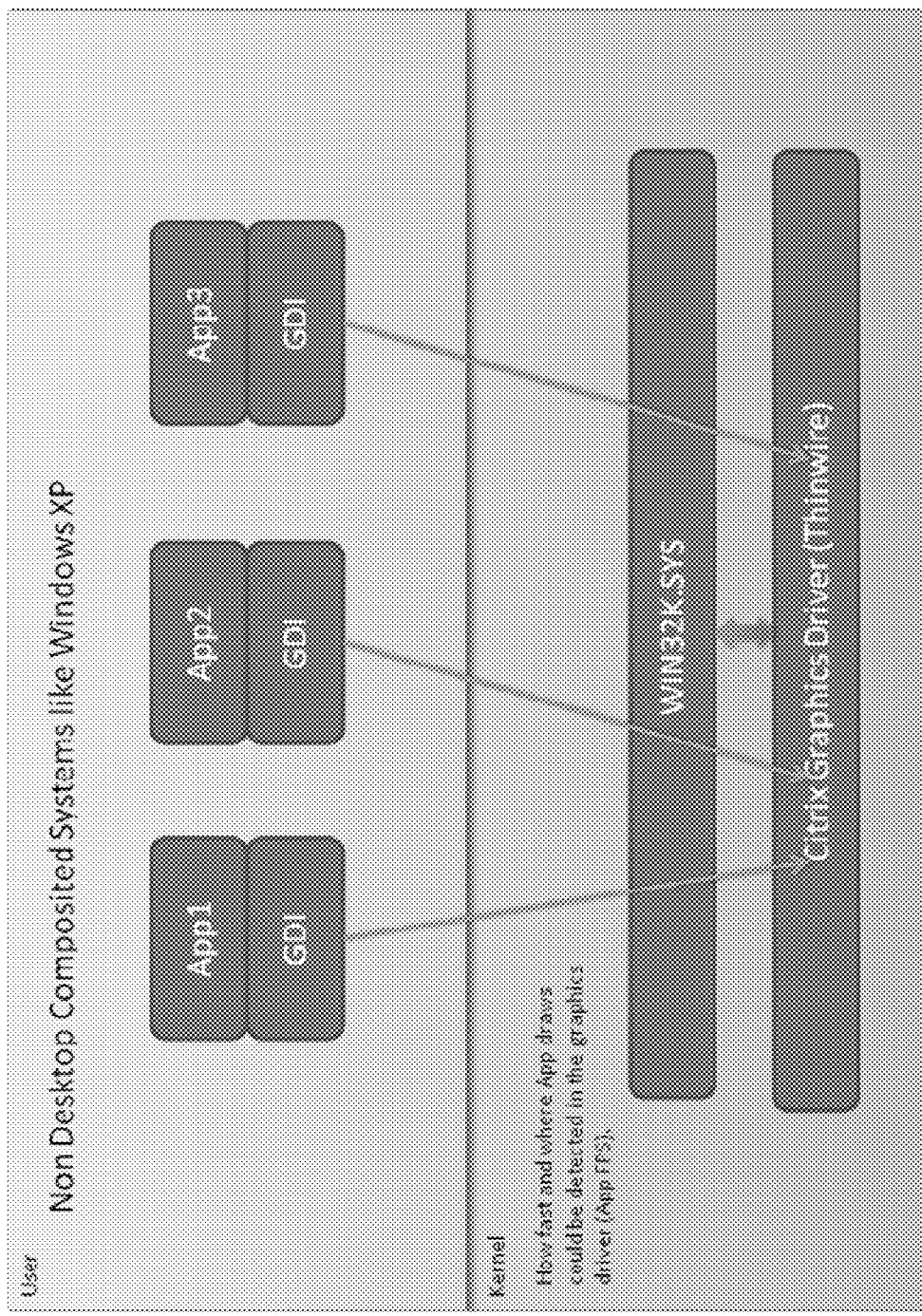
FIG. 2B is a block diagram depicting one embodiment of a system for selective implementation of progressive display techniques.

Referring now to FIG. 2B, an embodiment for implementing selective progressive display technique based on detected user interactivity is displayed. FIG. 2B illustrates applications App1, App2 and App3 running on the user level of the non desktop composited system, such as the Windows XP system. At kernel level, a function, such as the Citrix Graphics Driver or Thinwire is running along with Win32k.sys function. The Citrix Graphics Driver function may detect a change in the frame rate for a given application and based on the change of the frame rate, the function may determine that the user began interacting with the given application. The function may, in response to this determination, implement the selective progressive display technique by notifying the display manager 220 that the user began interacting with the application more actively. The display manager 220 may then send instructions to compress or decompress the application output data of the given application in order to accommodate the increased need for the user for the duration of the interaction of the user with the application. The application output data may include any data to be displayed in the window or any identification of an update to the output data of the application. In some embodiments, an identification of an update to the application output data includes one or more commands or instructions for making changes or drawing in a window. In further embodiments, an identification of an update to the application output data includes instructions to modify an image. An identification of an update to the output data may include any instruction or data for each pixel, for a set of pixels, an entire window or any number of portions of a window to be modified or redrawn.

A function or a driver, such as Citrix Graphics Driver or Thinwire driver may establish which application operating on remote computing device 106 is submitting data for displaying on a remote window on device 102. The function may operate on the local computing device 102. In some embodiments, the function operates on the remote computing device 106. The function may be an operation or a function of a local agent 224 or a remote agent 222. In some embodiments, the function is a display manager 220. The function may identify the relevant application using the process name. The function may also determine where on the screen of the local computing device 102 the application is drawing or displaying graphics. The function may also determine how fast the application is drawing or displaying graphics, including the bitmaps. When the user interacts with the window of the application, such as first window 204 or the second window 210, the application may draw faster, such that the frame rate in frames per second increases in a particular area of the screen. The increase in the frame rate could be for a short period of time when the user is interacting with the application or for an extended period of time. The increase in the frame rate may be detected by the function so that the function detects or sees the burst of frames from that application. In some embodiments, the function detects that the user began interacting with the application via ICA by detecting a rise in the frame rate for a particular application or a window of the application. In some embodiments, the techniques for selective progressive display of data in a window 204 or 206 are applied within the selected bitmaps of the application during the time when the function or the driver sees the burst of activity (till user is interacting). In some embodiments, the function is a desktop composited system where an application frame rate for a specific video buffer shoots up when the user interacts with the application. In such embodiments, the selective progressive display technique is applied to selected bitmaps of those applications with which the user interactions. In further embodiments, the selective progressive display technique is applied for the period of time during which the function sees the increased frames per second activity for the given application.

Figure 2C:
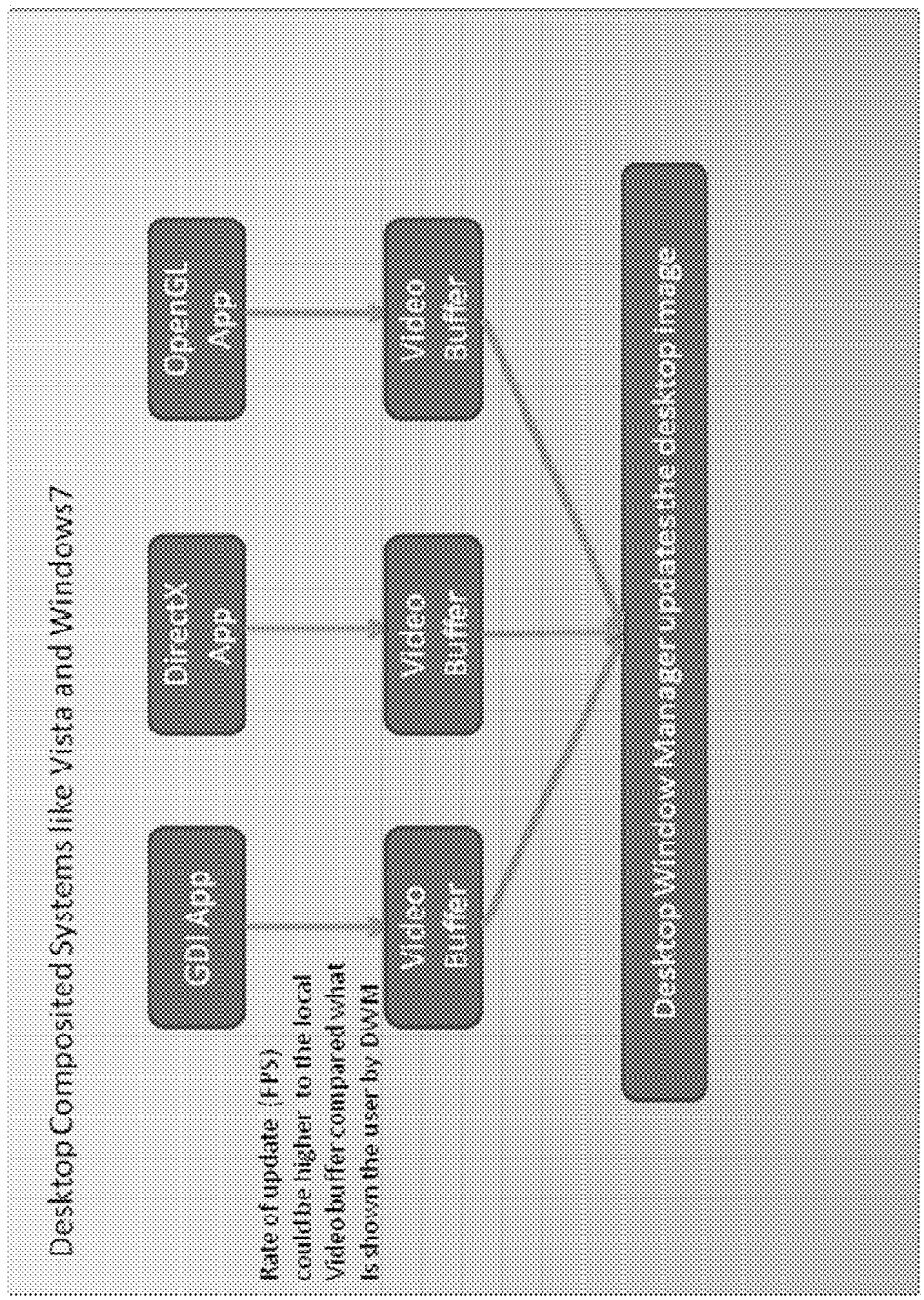
FIG. 2C is a block diagram depicting one embodiment of a system for selective implementation of progressive display techniques.

Referring now to FIG. 2C, an embodiment for implementing selective progressive display technique for non-interactive applications is displayed. In some embodiments, the non-interactive applications may include media applications or video displaying applications for playing video or graphic files on the client device. Applications, such as GDI App, DirectX App and Open GL App may be operating on a device 102 and/or 106. Each of these applications may be connected to an individual video buffer. The rate of update of the videos in frames per second of applications may be high. In some embodiments, Desktop Window Manager of the operating system may reduce the frame rate of the videos in order to conserve the bandwidth. For example, Desktop Window Manager may reduce the frames per second for one or more video streams for the output of one or more applications.

An application generating data to be displayed on a window at device 102 may generate the video output at a higher frame rate. Some video applications may be displaying video at a faster frame rate than other applications. However, in some embodiments, an application displaying the videos in windows 204 or 210 may be drawing in the same area on the screen most of the times. This location of drawing may be different from an interactive application in which drawing data may address changes in the "nearby areas on the screen". In one embodiment, when a video is being played using a video or media application, such as the Quicktime player for example, the function, such as the Desktop Window Manager, may identify the media application and determine that this application draws within the same area on the screen. The function or the driver may determine that the media application is drawing faster than desired, such as for example at 24 frames per second, or higher. The function may reduce the frames per second to a number lower than 24 frames per second. The reduction in the frames per second may be based on the bandwidth needs, current settings for the video displays or even based on other applications the user may be interacting with. In some embodiments, the user may rotate a model using an interactive application. In such embodiments, the application would draw fast in the vicinity areas but not in the same area as the media application display area. The function may increase the rate of frames for the interactive application and decrease the frame rate of the video being displayed, based on the detected interaction by the user. In some embodiments, when the video application window is moved around or scrolled, the area where the application is drawing may change and settle down in the new area. Once the video bitmaps are detected, the selective progressive display on these video bitmaps may be applied. In such embodiments, the frames per second and the image quality of the video frames may dynamically vary based on the bandwidth. In some embodiments, the frames per second and the image quality may vary based on other applications the user may be interacting with. In further embodiments, the selective progressive display may use a CODEC technology, such as the video codecs (H.263/H.264, Theora). The data may be transmitted via ICA, via TCP or in some embodiments via different transports, such as UDP.

Figure 3:
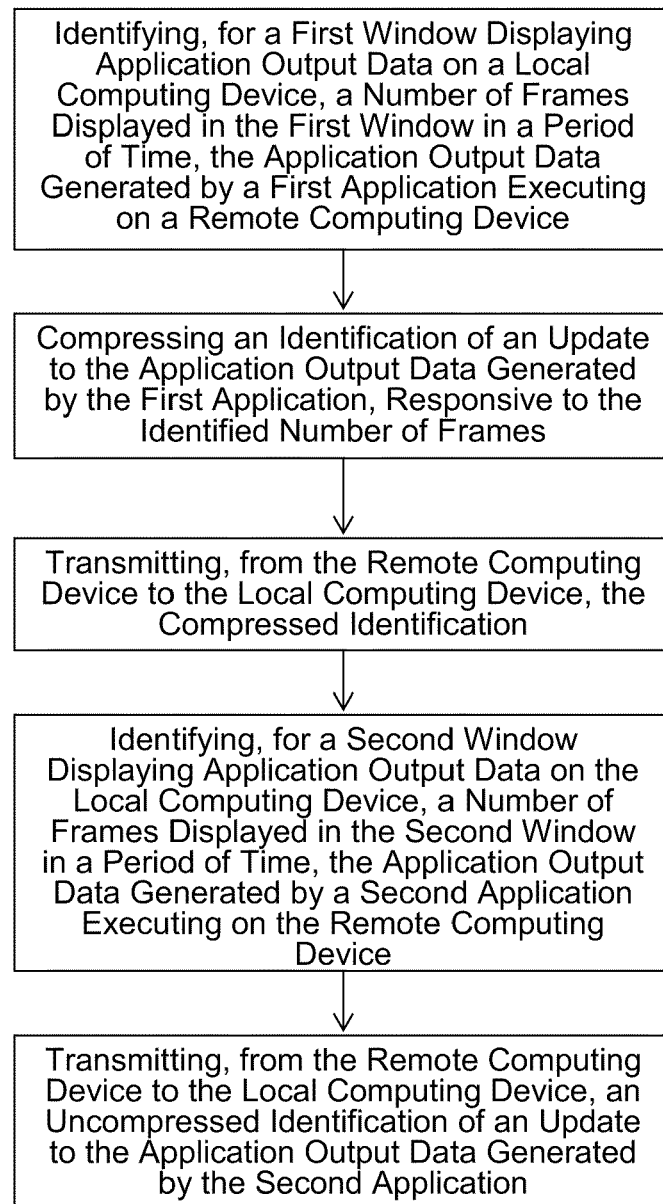
FIG. 3 is a flow diagram depicting one embodiment of a method for selective implementation of progressive display techniques, based on a number of frames displayed in windows in a period of time for individual application windows in composited desktop environments.

Referring now to FIG. 3, a flow diagram depicts one embodiment of a method for selective implementation of progressive display techniques, based on a change in frame rate of data displayed in a window of an application in a composited desktop environment. In brief overview, the method 300 includes identifying, for a first window displaying application output data on a local computing device, a number of frames displayed in the first window in a period of time, the application output data generated by a first application executing on a remote computing device (302). The method includes compressing an identification of an update to the application output data generated by the first application, responsive to the identified number of frames (304). The method includes transmitting, from the remote computing device to the local computing device, the compressed identification (306). The method includes identifying, for a second window displaying application output data on the local computing device, a number of frames displayed in the second window in a period of time, the application output data generated by a second application executing on the remote computing device (308). The method includes transmitting, from the remote computing device to the local computing device, an uncompressed identification of an update to the application output data generated by the second application (310).

In one embodiment, a number of frames displayed within a window of an application relates to a level of user interactivity with the application. In one example, if an application is set to update output data infrequently (typically resulting in a lower number of frames displayed within the period of time), a user may have be not interacting with the application as much as when the application is set to update output data frequently. In other words, the user interactivity may result in a high number of frames displayed within a window 204 or 210 within a period of time. In some embodiments, if a user interacts with data displayed by, or on behalf of, the application, the user may request or cause additional updates, such as adding or modifying data, or otherwise interacting with the application in such a way that the user benefits from more frequent updates to the data.

A display manager 220 may determine, based on an identification of a number of frames displayed in a window during a period of time, that a user of the local computing device 102 has a higher level of interactivity with the application output data. In still another of these embodiments, a component, such as the display manager 220, may determine, based on an identification of a number of frames displayed in a window during a period of time, that a user of the local computing device 102 has a low level of interactivity with the application output data. In other embodiments, the display manager 220 may determine to send a lower quality version of an update to output data, responsive to determining that there is a high rate of user interactivity with the output data. In still other embodiments, the display manager 220 determines to send a higher-quality version of an update to output data, responsive to determining that there is a low rate of user interactivity with the output data—that is, since the image is changing less frequently, a determination is made to provide a higher quality version of the image. In further embodiments, the display manager 220 receives an identification of a number of frames displayed in a first window associated with a first application in a period of time. The display manager 220 may determine to apply a level of quality to update output data generated by a second application for display in a second window based upon the identified number of frames displayed in the first window in the period of time.

In some embodiments in which the application is a non-interactive media application displaying a video, the application may generate frames per second that are too bandwidth demanding. In such embodiments, display manager 220 may reduce the frame rate of the output of the application to save on the bandwidth. Display manager 220 may make such reductions by compressing the media application output data or by removing some frames of the application. Display manager 220 may reduce the frame rate of the media application in response to an interactive application also used by the client demanding a larger frame rate. In such embodiments, the display manager 220 may compress the output of the media application or reduce the output size of the media application and increase the output size of the interactive application or transmit the interactive application output uncompressed.

Still referring to FIG. 3, and in greater detail, a number of frames displayed in the first window in a period of time are determined for a first window displaying application output data on a local computing device, the application output data generated by a first application executing on a remote computing device (302). In some embodiments, the number of frames displayed in the period of time is a number of frames per second. In other embodiments, the first hooking component 202 determines the number of frames displayed in the first window 204 during the period of time.

In one embodiment, the first hooking component 202 intercepts a command, from the first application 206 to the remote agent 222, to instruct the local agent 224 to direct the modification of a setting of the first window 204 such that the first window 204 displays the number of frames. In another embodiment, the first hooking component 202 intercepts a command from the first application 206 to an operating system executing on the remote computing device 106. The command may include an instruction to modify a setting of a number of frames to display in a window associated with the first application 206. For example, a function running on the operating system may modify the setting of a number of frames displayed by a third window generated on the remote computing device 106. In still another embodiment, the first hooking component 202 analyzes data intercepted from a communication between the first application 206 and an operating system executing on the remote computing device 106 in order to determine the number of frames displayed in the first window 204 in the period of time. In yet another embodiment, the first hooking component 206 transmits, to the display manager 220, the determination of the number of frames displayed in the first window 204 in the period of time. In yet a further embodiment, a Citrix Graphics Driver or a Desktop Window Manager of the display manager 220 generates the command to modify the frame rate of a window associated with the particular application.

In one embodiment, the first hooking component 202 intercepts a command by the first application 206 to present a frame. The first hooking component 202 may monitor the frame rate of the output of the first application 206 and may detect a change in the frame rate. In some embodiments, the first hooking component 202 detects a rise in the frame rate. In other embodiments, the first hooking component detects a reduction in the frame rate. In another embodiment, the first hooking component 202 intercepts a command by the first application 206 to update a buffer containing output data for display. In still another embodiment, the first hooking component 202 intercepts a command transmitted from the first application 206 to an application programming interface, such as a graphics design interface (GDI).

In one embodiment, the display manager 220 receives, from the first hooking component 202, an identification of a number of frames displayed in the first window 204 during a period of time. In further embodiments, display manager 220 receives, from the first hooking component 202, indication that a change in the frame rate was detected. The first hooking component 202 may inform the display manager 220 of rate of change. In another embodiment, the display manager 220 determines, responsive to the received identification, to implement a progressive display technique to subsequent updates of application output data transmitted from the first application 206 to the local computing device 102.

An identification of an update to the application output data generated by the first application is compressed, responsive to the identified number of frames (304). In some embodiments, the remote agent 222 receives an instruction from the display manager 220 to apply a progressive display technique to the identification of the update to the application output data. In one of these embodiments, the remote agent 222 receives an instruction to compress all data transmitted from the remote agent 222 to the local agent 224 for display in the first window 204. In another of these embodiments, the remote agent 222 receives an instruction to compress identifications of update to the application output data generated by the first application 206. In still another of these embodiments, the remote agent 222 compresses the identification of the application output data. The remote agent 220 may receive instructions to compress or decompress any data relating the application 206

In other embodiments, the display manager 220 compresses the identification of the update to the application output data generated by the first application 206. In one of these embodiments, the display manager 220 transmits, to the remote agent 222, the compressed identification of the update to the application output data generated by the first application 206 for transmission to the local computing device 102.

The compressed identification is transmitted from the remote computing device to the local computing device (306). In one embodiment, the remote agent 222 transmits the compressed identification to the local agent 224. In another embodiment, the local agent 224 decompresses the received identification. In still another embodiment, the local agent 224 directs the display of the updated output data in the first window 204. In yet another embodiment, the local agent 224 transmits, to a local desktop window manager, for display in the first window 204, the decompressed identification of the update to the application output data generated by the first application 206.

A number of frames displayed in the second window in a period of time is identified for a window displaying application output data on the local computing device, the application output data generated by a second application executing on the remote computing device (308). In one embodiment, the second hooking component 208 identifies the number of frames displayed in the second window 210. In another embodiment, the second hooking component 208 provides the functionality for identifying a number of frames as described above in connection with the first hooking component 202 at FIG. 3 (302).

An uncompressed identification of an update to the application output data generated by the second application is transmitted from the remote computing device to the local computing device (310). In one embodiment, the identification of the update to the application output data generated by the second application 212 is transmitted to the local computing device 102 in one format (e.g., uncompressed) while identifications of updates to output data generated by the first application 206 is transmitted to the local computing device 102 in a second format (e.g., compressed), based upon a determination that a user would benefit from a higher level of image quality provided for viewing the update to the application output data generated by the second application 212 than a level of image quality provided for viewing the update to the application output data generated by the first application 206.

Figure 4:
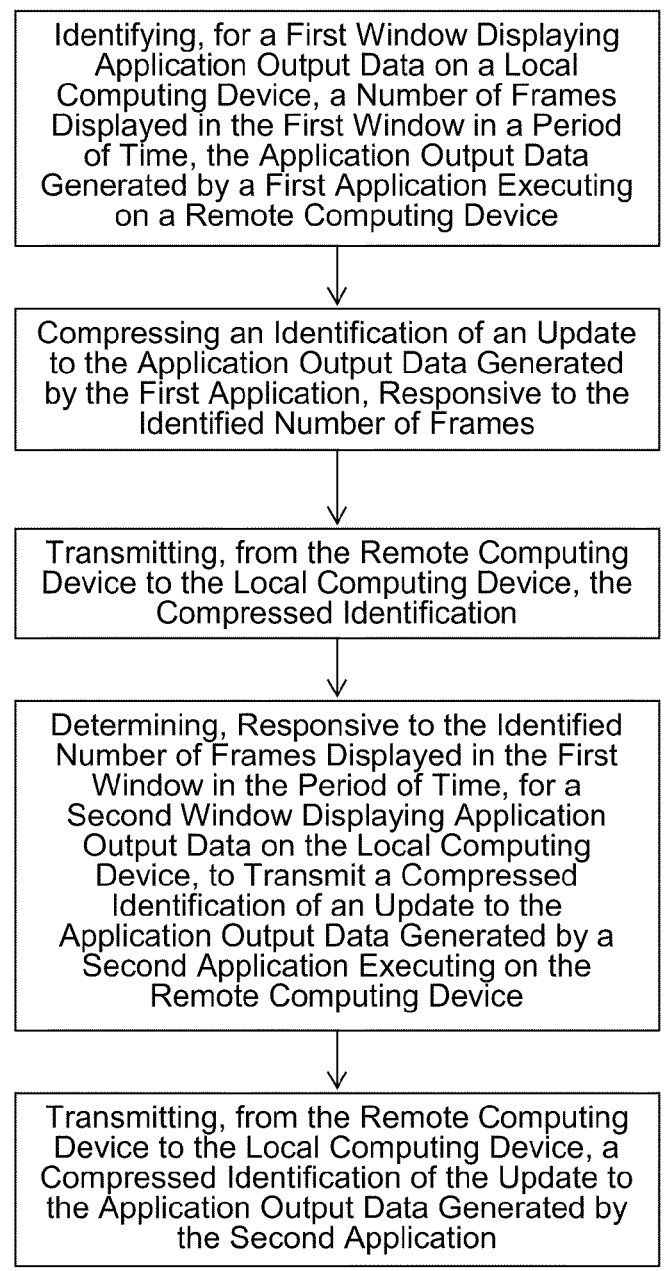
FIG. 4 is a flow diagram depicting an embodiment of a method for selective implementation of progressive display techniques, based on a number of frames displayed in windows in a period of time for individual application windows in composited desktop environments.

Referring now to FIG. 4, a flow diagram depicts another embodiment of a method for selective implementation of progressive display techniques, based on a number of frames displayed in windows in a period of time for individual application windows in composited desktop environments. In brief overview, the method 400 includes identifying, for a first window displaying application output data on a local computing device, a number of frames displayed in the first window in a period of time, the application output data generated by a first application executing on a remote computing device (402). The method includes compressing an identification of an update to the application output data generated by the first application, responsive to the identified number of frames (404). The method includes transmitting, from the remote computing device to the local computing device, the compressed identification (406). The method includes determining, responsive to the identified number of frames displayed in the first window in the period of time, for a second window displaying application output data on the local computing device, to transmit a compressed identification of an update to the application output data generated by a second application executing on the remote computing device (408). The method includes transmitting, from the remote computing device to the local computing device, a compressed identification of an update to the application output data generated by the second application (410).

Referring now to FIG. 4, and in greater detail, a number of frames displayed in the first window in a period of time are determined for a first window displaying application output data on a local computing device, the application output data generated by a first application executing on a remote computing device (402). In some embodiments, the determination of the number of frames displayed in the first window in the period of time occurs as described above in connection with FIG. 3 (302).

An identification of an update to the application output data generated by the first application is compressed, responsive to the identified number of frames (404). In some embodiments, the compression of the identification of the update to the application output data generated by the first application occurs as described above in connection with FIG. 3 (304).

The compressed identification is transmitted from the remote computing device to the local computing device (406). In some embodiments, the transmission of the compressed identification occurs as described above in connection with FIG. 3 (306).

A determination is made, responsive to the identified number of frames displayed in the first window in the period of time, for a second window displaying application output data on the local computing device, to transmit a compressed identification of an update to the application output data generated by a second application executing on the remote computing device (408). In one of these embodiments, the display manager 220 determines that a number of frames displayed during a period of time by a first application indicates that a user is interacting with the first application at a high rate and, therefore, would not be adversely impacted by application of a compression technique to the output data—for example, the application of a lossy compression algorithm to an identification of an update, which might result in a lower quality image than the application of a different compression technique.

A compressed identification of an update to the application output data generated by the second application is transmitted from the remote computing device to the local computing device (410). In some embodiments, therefore, the display manager 220 determines to transmit compressed output data updates for a first application while transmitting uncompressed output data updates for a second application.

Figure 5:
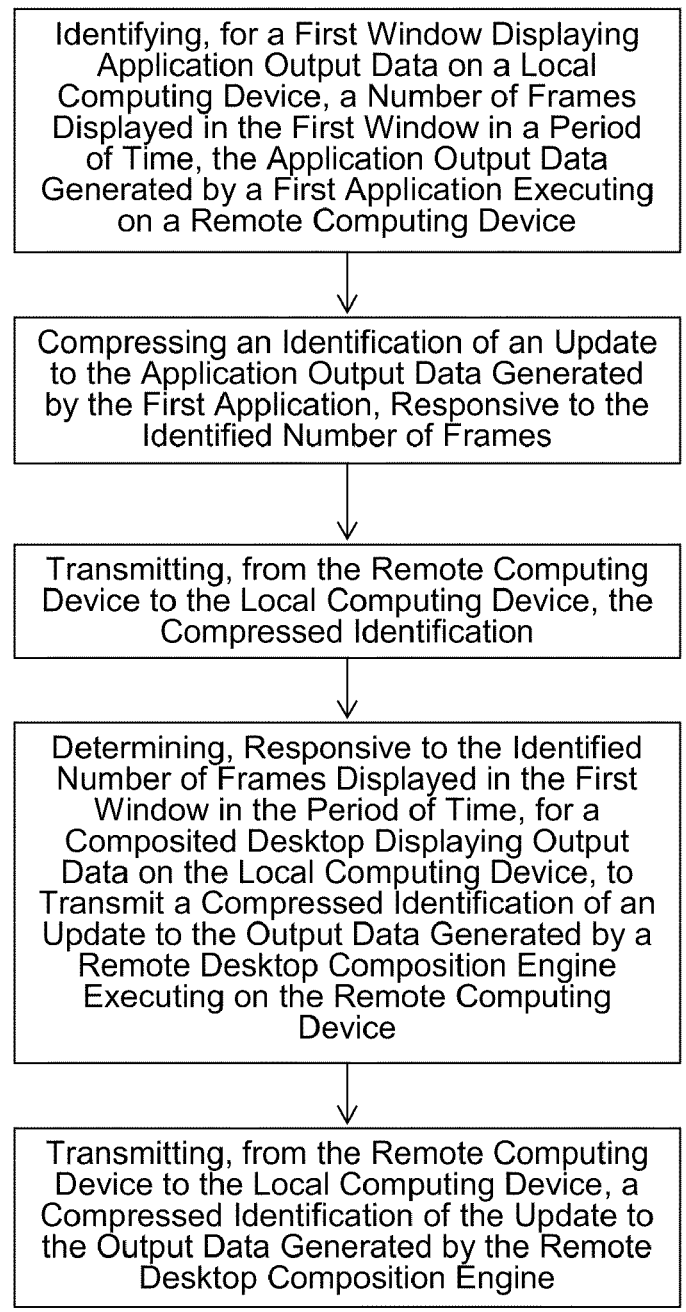
FIG. 5 is a flow diagram depicting another embodiment of a method for selective implementation of progressive display techniques, based on a number of frames displayed in windows in a period of time for individual application windows in composited desktop environments.

Referring now to FIG. 5, a flow diagram depicts an embodiment of a method for selective implementation of progressive display techniques, based on a number of frames displayed in windows in a period of time for individual application windows in composited desktop environments. In brief overview, the method 500 includes identifying, for a first window displaying application output data on a local computing device, a number of frames displayed in the first window in a period of time, the application output data generated by a first application executing on a remote computing device (502). The method includes compressing an identification of an update to the application output data generated by the first application, responsive to the identified number of frames (504). The method includes transmitting, from the remote computing device to the local computing device, the compressed identification (506). The method includes determining, responsive to the identified number of frames displayed in the first window in the period of time, for a composited desktop displaying output data on the local computing device, to transmit a compressed identification of an update to the output data generated by a remote desktop composition engine executing on the remote computing device (508). The method includes transmitting, from the remote computing device to the local computing device, a compressed identification of the update to the output data generated by the second application (510).

Referring now to FIG. 5, and in greater detail, a number of frames displayed in the first window in a period of time are determined for a first window displaying application output data on a local computing device, the application output data generated by a first application executing on a remote computing device (502). In some embodiments, the determination of the number of frames displayed in the first window in the period of time occurs as described above in connection with FIG. 3 (302).

An identification of an update to the application output data generated by the first application is compressed, responsive to the identified number of frames (504). In some embodiments, the compression of the identification of the update to the application output data generated by the first application occurs as described above in connection with FIG. 3 (304).

The compressed identification is transmitted from the remote computing device to the local computing device (506). In some embodiments, the transmission of the compressed identification occurs as described above in connection with FIG. 3 (306).

A determination is made, responsive to the identified number of frames displayed in the first window in the period of time, for a composited desktop displaying output data on the local computing device, to transmit a compressed identification of an update to the output data generated by a remote desktop composition engine executing on the remote computing device (508). In one embodiment, the display manager 220 determines that a number of frames displayed during a period of time by a first application indicates that a user is interacting with the first application at a high rate and, therefore, would not be adversely impacted by application of a compression technique to the output data selected for display by the remote desktop composition engine 232—for example, by the application of a lossy compression algorithm to an identification of an update, which might result in a lower quality image than the application of a different compression technique. A compressed identification of the update to the output data generated by the remote desktop composition engine is transmitted from the remote computing device to the local computing device (510).

In some embodiments, a compression technique includes methods for updating display units of devices such as the local computing device 102. In other embodiments, an example compression technique includes a method for applying a compression algorithm based upon an amount of bandwidth available for communication between the remote computing device 106 and the local computing device 102. In one of these embodiments, a method may include: (a) copying display information from a video buffer of a computing device 106 executing an application remotely located from the computing device 102 to generate a display update; (b) calculating a size of the display update; (c) determining an amount of available bandwidth of a network connecting the computing device and the display unit; (d) calculating a time period required to communicate the display update from the computing device 106 to the computing device 102; (e) transmitting the display update to the display; and (f) repeating steps (a)-(e) after the time period has elapsed. In another of these examples, an application 206 generates output and issues drawing commands indicative of the graphical output of the application 206. Examples of drawing commands can include, but are not limited to, raster operations, GDI commands provided by WINDOWS-based operating systems, and QUICKDRAW or QUARTZ commands provided by MAC/OS-based operating systems. Drawing commands may also be referred to as "GDI commands". In still another of these embodiments, the drawing commands are written to a buffer provided by the computing device 106. In still another of these embodiments, embodiments, lower-level commands, such as interface calls to a device driver associated with the graphical display of the computing device 106 are written to the buffer. Periodically the contents of the buffer are communicated to the computing device 102. In another of these embodiments, how often the contents of the buffer are communicated to the remote display unit can be a function of the amount of data presently pending on the network. By dynamically determining the time period, the technique may provide a "just-in-time" delivery of the display update frame to the computing device 102. In still another of these embodiments, after determining the amount of change in the display, a display update frame is created and, if so required (e.g., if determined by the display manager 220 to be required for this particular update), a lossy compression technique is applied to the update display frame to create a lossy update display frame for transmission to the computing device 102. In yet another of these embodiments, a photographic codec is used (e.g., JPEG compression using arithmetic encoding). While this type of encoding is more processor intensive, it can decrease the size of the display update frame by as much as thirty percent relative to other codecs (e.g., JPEG compression using optimized Huffman encoding). Before applying the lossy compression algorithm, the display update frames may be cached. In another of these embodiments, the cached display update frames are subsequently forwarded to the remote display unit once the high update period has ended.

In other embodiments, an example compression technique includes a method for applying a compression algorithm based upon the elapsing of a predetermined time period. In one embodiment, for example, a method of updating a display unit of the local computing device 102 includes: (a) accessing display update information from an update queue storing drawing commands issued by an application 206; (b) caching the display update information; (c) applying a lossy compression algorithm to the display update information to create a lossy display update; (d) transmitting the lossy update to the local computing device 102; (e) applying a lossless compression algorithm to the display update information in the cache to create a lossless display update; (f) transmitting the lossless display update a predetermined of time after transmitting the lossy update. In some embodiments, certain portions of certain updates may be subjected to a lossy compression algorithm. In one of these embodiments, the application of lossy compression is controlled by manually invoking an operational mode by setting a global flag; for example, the compression mode can be switched on and off by the user. In another of these embodiments, the display manager 220 indicates whether the update is to be subjected to a lossy compression algorithm. In still another of these embodiments, the lossy compression algorithm is a photographic codec (e.g., JPEG compression using arithmetic encoding); while this type of encoding is more processor intensive, it can decrease the size of the display update frame by as much as thirty percent relative to other codecs (e.g., JPEG compression using optimized Huffman encoding). In still even another embodiment, other lossy compression techniques are used. In yet another of these embodiments, if no new drawing commands are present in a buffer, a lossless compression algorithm is applied to a copy of the display in the buffer to generate a lossless display update, which is then transmitted to the local computing device 102.

In still other embodiments of compression techniques, a method approximates progressive image encoding using a technique that takes advantage of image partitioning and interpolation to approximate the results of progressive image encoding. In one of these embodiments, an image partitioner on a remote computing device 106 receives an image and partitions that image into fields according to a predetermined number of horizontal and vertical fields. In another of these embodiments, partitioning the image creates a resulting image that has pixels assigned or associated with a particular field, where the fields are interlaced throughout the image and therefore throughout the pixels. In still another of these embodiments, from the partitioned image, image blocks or image portions are created where each image block is associated with a particular field. In still even another of these embodiments, the image blocks are encoded by an encoder and transmitted to the local computing device 102 over a communication channel. In still another of these embodiments, the local agent 224 on the local computing device 102 receives each image block and forwards the image block to a decoder (not shown) which then decodes each image block. In another of these embodiments, from the decoder, the image blocks are sent to a combining agent (not shown) which de-interlaces each received image block with other received image block and interpolates using weighted averages of nearby pixels to approximate the pixel values of missing pixels. In yet another of these embodiments, when the image has been interpolated or fully reconstructed, the image is displayed on the local computing device 102.

In some embodiments, a compression technique includes a method for progressive display. In one of these embodiments, for example, a user of the local computing device 102 requests access to output data generated by the application 206 and the remote agent 222, in communication with the display manager 220, transmits a response to the local computing device 102 including a highly-compressed, initial image. In another of these embodiments, over the next few frame refreshes, any on-screen images that have not changed are updated with progressively higher-quality images until they are substantially lossless (e.g., uncompressed). In another of these embodiments, the initial image may not be highly compressed, as it may be an image that was encoded or compressed at a first level of quality depending on, for example, network conditions, while a subsequent image may be encoded or compressed at a second level of quality (for example, a higher level of quality than the first level); subsequent images may be encoded at increasingly-high levels of quality until a desired level of quality is reached. In still another of these embodiments, the initial and subsequent images may be encoded via a lossy encoding/compression technique providing increasing level of detail on each encoding, until a predetermined threshold of quality of image is reached (which still may be lossy) or a lossless image is obtained. In yet another of these embodiments, the progressive display technique may be applied agnostically to any screen changes.

In other embodiments, progressive display methods include intelligent application of compression algorithms to ensure that regardless of network latency or available bandwidth for communications between the local computing device 102 and the remote computing device 106, output data displayed on the local computing device 102 is displayed as promptly as possible. In one of these embodiments, application of compression algorithms to data allows a compressed image to be transmitted to the local computing device 102 and then provides progressive refinement of the quality of the image over time. In another of these embodiments, selective application of compression techniques—or of progressive display methods themselves—provide improved efficiency in transmitting data to a computing device 102 over a network 104.

In still other embodiments of systems for progressive display, the display manager 220 is referred to as a host processor. In one of these embodiments, such a host processor may include the functionality of the remote agent 222. In another of these embodiments, the host processor includes the functionality of the display manager 220. In still another of these embodiments, the host processor includes an image engine in communication with the display manager 220 that applies compression techniques to output data upon instruction by the display manager 220 to do so. In another of these embodiments, the host processor includes a display manager 220, a remote agent 222, and an image engine. In still even another of these embodiments, a host processor may be provided, by way of example, as a system-on-chip or as a software process executing on the remote computing device 106. In yet another of these embodiments, the local agent 224 may be referred to as a portal.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for selective implementation of progressive display techniques, it will now become apparent to one of skill in the art that other embodiments incorporating the concepts of the invention may be used.

I claim:

1. A method for selective implementation of progressive display techniques, based on a number of frames displayed in a window in a period of time, the method comprising:
   identifying, by a first hooking component, for a first window displaying first application output data on a local computing device, a number of frames displayed in the first window in a period of time, the first application output data generated by a first application executing on a remote computing device;
   compressing, by a remote agent, an identification of an update to the first application output data generated by the first application, responsive to the identified number of frames;
   transmitting, by the remote agent, from the remote computing device to the local computing device, the compressed identification;
   identifying, by a second hooking component, for a second window displaying second application output data on the local computing device, a number of frames displayed in the second window in a period of time, the second application output data generated by a second application executing on the remote computing device; and transmitting, by the remote agent, from the remote computing device to the local computing device, an uncompressed identification of an update to the second application output data generated by the second application.

2. The method of claim 1, further comprising receiving, by the first hooking component, information identifying a number of frames generated by the first application.

3. The method of claim 2, further comprising forwarding, by the first hooking component, the information identifying the number of frames to a display manager.

4. The method of claim 1, further comprising monitoring, by a display manager, the frame rate of the first application output data and the second application output data.

5. The method of claim 1, further comprising determining, by the display manager, that a frame rate of the first application output data has changed.

6. The method of claim 5, further comprising generating, by the display manager, an instruction for the remote agent to compress the identification of the update to the first application output data in response to determining that the frame rate has changed.

7. The method of claim 1, wherein the first hooking component, the second hooking component and the display manager are functions within a driver executing in connection with a non-desktop composited system.

8. The method of claim 1, further comprising:
determining, by a display manager, based on the information identifying the number of frames that a frame rate of the first application output data has changed;
transmitting, by the display manager to the remote agent, an instruction to compress the identification of the update to the first application output data based on the determined change in the frame rate; and
transmitting, by the display manager to the remote agent, an instruction not to compress the identification of the update to the second application output data based on the determined change in the frame rate.

9. A method for selective implementation of progressive display techniques, based on a number of frames displayed in a window, the method comprising:
identifying, by a first hooking component, for a first window displaying first application output data on a local computing device, a number of frames to be displayed in the first window in a period of time, the first application output data generated by a first application executing on a remote computing device;
generating, by a display manager, based on the identified number of frames to be displayed, an instruction to compress an identification of an update to the first application output data generated by the first application;
compressing, by a remote agent, an identification of an update to the first application output data generated by the first application;
transmitting, by the remote agent, from the remote computing device to the local computing device, the compressed identification;
determining, by a display manager, for a second window displaying second application output data on the local computing device, whether to compress or not to compress a second identification of an update to the second application output data generated by a second application executing on the remote computing device; and
transmitting, by the remote agent, from the remote computing device to the local computing device, the second identification of the update to the second application output data generated by the second application, the second identification of the update to the second application output data compressed or not compressed based on the determination by the display manager.

10. The method of claim 9, further comprising determining, by the display manager, to compress or not to compress the second identification of the update to the second application output data in response to identifying the number of frames displayed in the first window in the period of time.

11. The method of claim 9, further comprising monitoring, by the display manager, the frame rate of the first application output data and the second application output data.

12. The method of claim 9, further comprising:
determining, by the display manager, to compress the second identification of an update to the second application output data; and
transmitting, by the remote agent to a receiving agent at the local computing device, compressed second identification of the update to the second application output data generated by the second application.

13. The method of claim 9, further comprising:
determining, by the display manager, not to compress the second identification of an update to the second application output data; and
transmitting, by the remote agent to a receiving agent at the local computing device, uncompressed second identification of the update to the second application output data generated by the second application.

14. The method of claim 9, wherein the first hooking component, the second hooking component and the display manager are functions within a driver executing in connection with a non-desktop composited system.

15. A method for selective implementation of progressive display techniques, based on a number of frames displayed in windows within a period of time for individual applications executing in an environment, the method comprising:
identifying, for a first window displaying first application output data on a local computing device, a number of frames displayed in the first window in a period of time, the first application output data generated by a first application executing in an environment on a remote computing device;
compressing an identification of an update to the first application output data generated by the first application, responsive to the identified number of frames;
transmitting, from the remote computing device to the local computing device, the compressed identification;
determining, responsive to the identified number of frames displayed in the first window in the period of time, for the environment displaying output data on the local computing device, to transmit a compressed identification of an update to the output data generated by a remote desktop window manager on the remote computing device; and
transmitting, from the remote computing device to the local computing device, a compressed identification of the update to the output data generated by the remote desktop window manager.

16. The method of claim 15, wherein the environment comprises a desktop composited system.

17. The method of claim 15, wherein the environment comprises a non-desktop composited system.

18. A system for selective implementation of progressive display techniques based on a number of frames displayed in a window, the system comprising:

a first hooking component executing on a remote computing device and identifying, for a first window displaying first application output data on a local computing device, a number of frames displayed in the first window in a period of time, the first application output data generated by a first application executing on the remote computing device;

a second hooking component executing on the remote computing device and identifying, for a second window displaying second application output data on the local computing device, a number of frames displayed in the second window in a period of time, the second application output data generated by a second application executing on the remote computing device;

a display manager executing on the remote computing device and determining whether or not to direct compression of at least one of a first output application data update generated by the first application and a second output application data update generated by the second application; and a remote agent executing on the remote computing device receiving an instruction from the display manager to compress the first output data update, receiving an instruction from the display manager not to compress the second output data update, compressing the first output data update, and transmitting, to the local computing device, the compressed first output data update and the uncompressed second output data update.

19. The system of claim 14, wherein the remote agent further comprises a receiver for receiving an instruction from the display manager.

20. The system of claim 14 further comprising a remote desktop window manager executing on the remote computing device and generating a composited desktop environment.

21. The system of claim 16 further comprising a local desktop window manager executing on the local computing device and displaying the composited desktop environment generated by the remote desktop window manager.

22. The system of claim 14 wherein the display manager further comprises means for determining to direct the compression of the second output data update responsive to the identification of the number of frames displayed in the first window in the period of time.

23. The system of claim 18, wherein the remote agent further comprises:
means for receiving an instruction from the display manager to compress the second output data update;
means for receiving an instruction from the display manager not to compress the first output data update;
means for compressing the second output data update; and
means for transmitting, to the local computing device, the compressed second output data update and the uncompressed first output data update.

24. The system of claim 4 wherein the display manager further comprises means for determining, responsive to the identified number of frames displayed in the first window in the period of time, for a composited desktop displaying output data on the local computing device, to direct the compression of an update to the output data generated by a remote desktop window manager executing on the remote computing device.

25. The system of claim 10, wherein the remote agent further comprises:
means for receiving an instruction from the display manager to compress the output data update generated by the remote desktop window manager;
means for compressing the output data update generated by the remote desktop window manager; and
means for transmitting, to the local computing device, the compressed output data update generated by the remote desktop window manager.

26. The system of claim 18, wherein the first hooking component, the second hooking component and the display manager are functions within a driver executing in connection with a non-desktop composited system.

27. The system of claim 18, wherein the display manager, the first hooking component and the second hooking component execute within a desktop composited system.

* * * * *